United States Patent
Ku et al.

(10) Patent No.: US 8,050,621 B2
(45) Date of Patent: Nov. 1, 2011

(54) METHOD AND APPARATUS FOR ESTIMATING/REMOVING ECHO SIGNAL USING CHANNEL COEFFICIENT PREDICTING TECHNIQUE IN MULTI-CARRIER SYSTEM

(75) Inventors: Jung-Woo Ku, Seoul (KR); Jae-Bum Kim, Seoul (KR); Hee-Won Kang, Seongnam-si (KR); Hwa-Sun You, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 489 days.

(21) Appl. No.: 12/391,878

(22) Filed: Feb. 24, 2009

(65) Prior Publication Data

US 2009/0215390 A1    Aug. 27, 2009

(30) Foreign Application Priority Data

Feb. 25, 2008  (KR) .................. 10-2008-0016673

(51) Int. Cl.
*H04Q 7/20* (2006.01)
(52) U.S. Cl. .................. 455/11.1; 455/7; 455/24
(58) Field of Classification Search ............ 455/7, 11.1, 455/23, 24
See application file for complete search history.

(56) References Cited

U.S. PATENT DOCUMENTS

| 6,411,649 | B1 | 6/2002 | Arslan et al. | |
| 7,596,352 | B2 * | 9/2009 | Ding et al. | 455/11.1 |
| 7,844,216 | B2 * | 11/2010 | Cleveland et al. | 455/7 |
| 7,894,768 | B2 * | 2/2011 | Ding et al. | 455/11.1 |

FOREIGN PATENT DOCUMENTS

| KR | 1020040075160 | 8/2004 |
| KR | 1020070106363 | 11/2007 |

\* cited by examiner

*Primary Examiner* — Hai L Nguyen
(74) *Attorney, Agent, or Firm* — The Farrell Law Firm, P.C.

(57) ABSTRACT

A method and an apparatus are provided for estimating and removing interference of a signal at a wireless repeater operating in a multi-carrier system. In the method, a current echo channel linear prediction coefficient, which represents a coefficient between a current train signal section and a previous train signal section, is estimated using a current echo channel coefficient estimated in the current train signal section and a previous echo channel coefficient generated in the previous train signal section. A next echo channel coefficient is estimated using the current echo channel coefficient, the previous echo channel coefficient, and the current echo channel linear prediction coefficient. An echo channel coefficient outside a train signal section is estimated using the current echo channel coefficient and the next echo channel coefficient.

12 Claims, 6 Drawing Sheets

METHOD AND APPARATUS FOR ESTIMATING/REMOVING ECHO SIGNAL USING CHANNEL COEFFICIENT PREDICTING TECHNIQUE IN MULTI-CARRIER SYSTEM

PRIORITY

This application claims priority under 35 U.S.C. §119 to an application filed in the Korean Intellectual Property Office on Feb. 25, 2008 and assigned Serial No. 10-2008-0016673, the contents of which are incorporated herein by reference.

BACKGROUND OF THE INVENTION

1. Field of the Invention

The present invention relates generally to a method and an apparatus for estimating and removing an echo channel. The present invention relates particularly to a method and an apparatus for estimating the echo signal formed when an output signal of a transmission antenna of a wireless repeater returns and is re-input via a reception antenna, and transmitting, via the transmission antenna, a signal from which the estimated echo signal has been removed in advance.

2. Description of the Related Art

Mobile communication plays an important role in the development of an information-oriented society. It is optimal for a mobile communication system to allow a subscriber to utilize the functions of an entire communication network wirelessly, so that the subscriber may communicate with anybody, anywhere, at anytime. The mobile communication system utilizes a wireless repeater for swift communication in a communication scheme based on wireless and mobile communication technologies, such as indoor/outdoor wireless data communication, vehicle and cellular phone, a future personal communication network, etc. The wireless repeater is equipment for primary use in a shadow region, such as a shielded space, an underground shopping center, a tunnel, and an underground parking lot, where it is not suitable to newly establish a base station or operate a relay vehicle. The wireless repeater extracts a weak signal to be relayed from signals still existing in a shielded space or a shadow region, amplifies the extracted signal with a low noise, and re-transmits the amplified signal via an antenna, thereby allowing mobile communication even in a communication obstacle region.

However, when the wireless repeater transmits a radio signal to a mobile terminal, oscillation or a fine oscillation is generated due to the fact that an output signal of a transmission antenna returns, is re-input via a reception antenna and is amplified, thereby deteriorating signal quality. Such a limitation can be resolved using a method of separating the transmission/reception antennas of the wireless repeater by a sufficient distance. However, this method causes the installation costs of a wireless repeater to increase and it is difficult to select a region where installation is possible in a scattering environment such as the downtown.

To prevent the above-described oscillation phenomenon without providing additional separation distance between a transmission antenna and a reception antenna, a technique is performed in which a signal returning from the transmission antenna to the reception antenna is estimated using digital signal processing in a baseband or an intermediate frequency band, and the estimated returning signal is removed. Due to time delay and costs, this technique generally uses a unique characteristic of a signal in order to estimate a returning signal without decoding a transmission/reception signal.

Since a spread spectrum scheme, such as Code Division Multiple Access (CDMA), uses a scrambling code, such as a pseudo noise code, the spread spectrum scheme has an auto-correlation characteristic where a discrete signal having a sampling frequency of a wireless repeater is excellent. Therefore, it is possible to prevent oscillation by an echo signal by estimating the echo signal using this autocorrelation characteristic and removing the estimated echo signal. However, in a wireless repeater where a multi-carrier system is applied that does not guarantee the autocorrelation characteristic, it is difficult to accurately estimate an echo signal and prevent oscillation.

Figure 1:
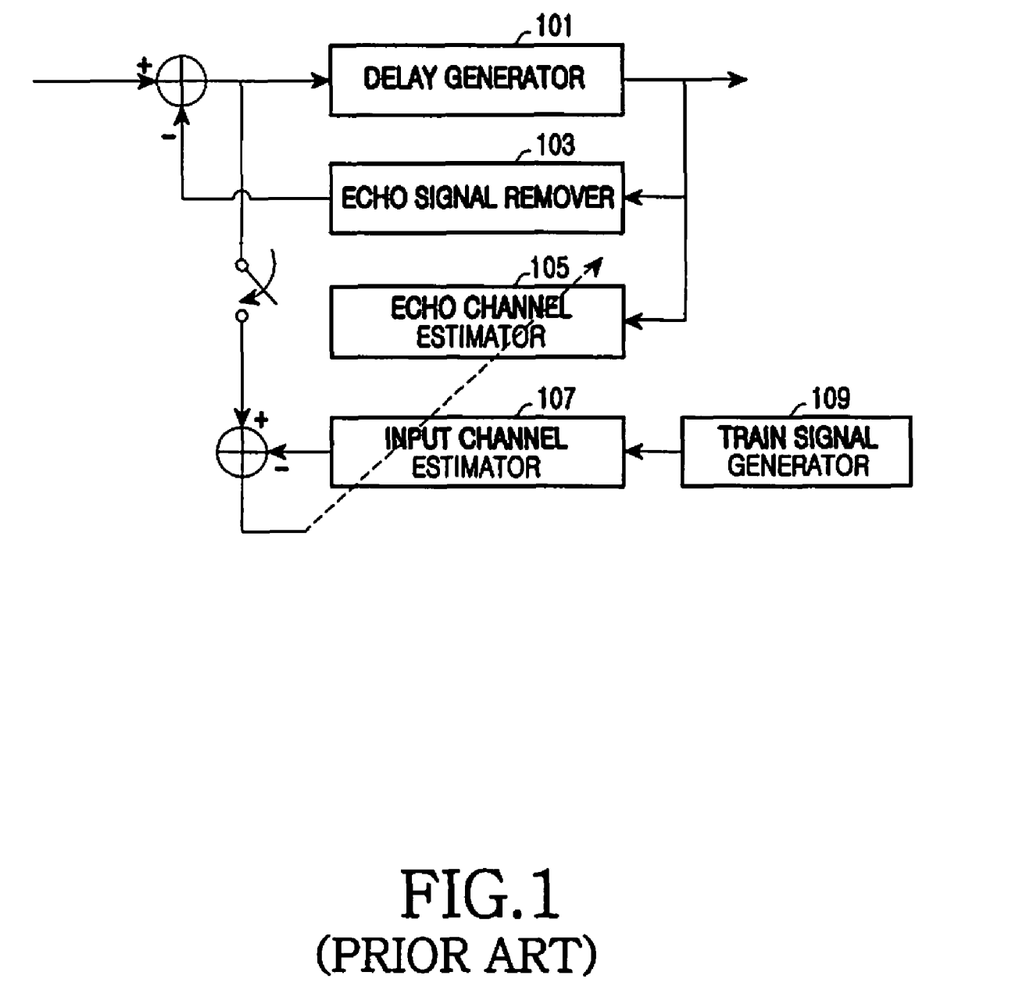
FIG. 1 is a block diagram illustrating the construction of an apparatus for removing an echo signal and preventing oscillation in a general wireless repeater.

FIG. 1 is a block diagram illustrating the construction of an apparatus for removing an echo signal and preventing oscillation in a general wireless repeater. Referring to FIG. 1, a multi-carrier input signal received via a reception antenna of a wireless repeater passes through a delay generator 101. The delay generator 101 compensates for a synchronization difference by an additional delay, such as a band pass filter required during analog/digital conversion, and is output to a transmission antenna. An echo signal is removed by applying an output signal of the delay generator 101 as an input of an echo signal remover 103, and subtracting a filter response of an echo signal estimator 105 from a multi-carrier input signal. For correct operation of the echo signal remover, an impulse response of an echo channel is estimated and used as a filter coefficient of the echo signal remover. When the multi-carrier input signal is in a time-division train signal section, a multi-carrier input signal is transferred to an input channel estimating unit through a switch. The input channel estimating unit includes an input channel estimator 107 and a train signal generator 109. The input channel estimating unit removes an input signal from an input signal of the echo channel estimator 105 by passing a train signal generated by the train signal generator 109 through the input channel estimator 107. When the above-described process is performed, an echo signal and an input signal are removed, so that only an additional noise is left. Therefore, when an estimation technique such as Least Square Estimation (LSE) and Minimum Mean Square Error Estimation (MMSE) is applied, an echo channel and an input channel filter coefficient can be estimated that minimize power sum of interference-removed output signal or average power.

However, since a train signal section of the multi-carrier system is an extremely small portion of an entire signal section, when a time-variant characteristic of an echo channel cannot be ignored due to an influence of neighboring scattering objects, in an aspect of an installation environment of a wireless repeater, quality of interference-removed signal may be deteriorated by a channel change between a periodic time-division train signal section and the other sections.

SUMMARY OF THE INVENTION

The present invention has been made to address at least the above problems and/or disadvantages and to provide at least the advantages described below. According, an aspect of the present invention provides a method and an apparatus for estimating and removing an echo signal at a wireless repeater operating in a multi-carrier system.

Another aspect of the present invention provides a method and an apparatus for estimating and removing an echo signal outside a train signal section.

According to one aspect of the present invention, a method is provided for removing an echo signal in a multi-carrier wireless repeater system. A current echo channel linear prediction coefficient representing a coefficient between a current train signal section and a previous train signal section is estimated using a current echo channel coefficient estimated in the current train signal section, and a previous echo channel coefficient generated in the previous train signal section. A next echo channel coefficient is estimated using the current echo channel coefficient, the previous echo channel coefficient, and the current echo channel linear prediction coefficient. An echo channel coefficient outside a train signal section is estimated using the current echo channel coefficient and the next echo channel coefficient.

According to another aspect of the present invention, a wireless repeater for removing an echo signal in a multi-carrier system is provided. The wireless repeater includes an echo channel estimating unit for estimating a current echo channel coefficient of a current train signal section. The wireless repeater further includes an echo channel linear prediction coefficient estimator for estimating a current echo channel linear prediction coefficient representing a coefficient between the current train signal section and a previous train signal section using the current echo channel coefficient and a previous echo channel coefficient, which is an echo channel coefficient of the previous train signal section. The wireless repeater also includes a next echo channel coefficient estimator for estimating a next echo channel coefficient using the current echo channel coefficient, the previous echo channel coefficient, and the current echo channel linear prediction coefficient; and an echo channel coefficient estimator outside the train signal section, for estimating an echo channel coefficient outside the train signal section using the current echo channel coefficient and the next echo channel coefficient.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

Terms described below, which are defined considering functions in the present invention, can be different depending on user and operator's intention or practice. Therefore, the terms should be defined on the basis of the disclosure throughout this specification.

Embodiments of the present invention provide a method and an apparatus for predicting an echo channel generated in a section outside a train signal section in order to prevent oscillation and deterioration of signal quality by an echo signal at a wireless repeater operating in a multi-carrier system.

An echo channel, as defined in the specification, is a channel re-input to a reception end in a wireless repeater operating in a multi-carrier system. Oscillation and a fine oscillation are generated to the echo channel, which causes deterioration of radio signal quality.

A train signal section, as defined in the specification, is a section including a train signal such as a preamble, and an echo channel linear prediction coefficient represents a coefficient for estimating a next train signal section. Specifically, the coefficient represents a section between a current train section and a next train section. Also, an echo channel outside the train signal section is an echo channel of a section between a specific preamble and a next preamble.

Figure 2:
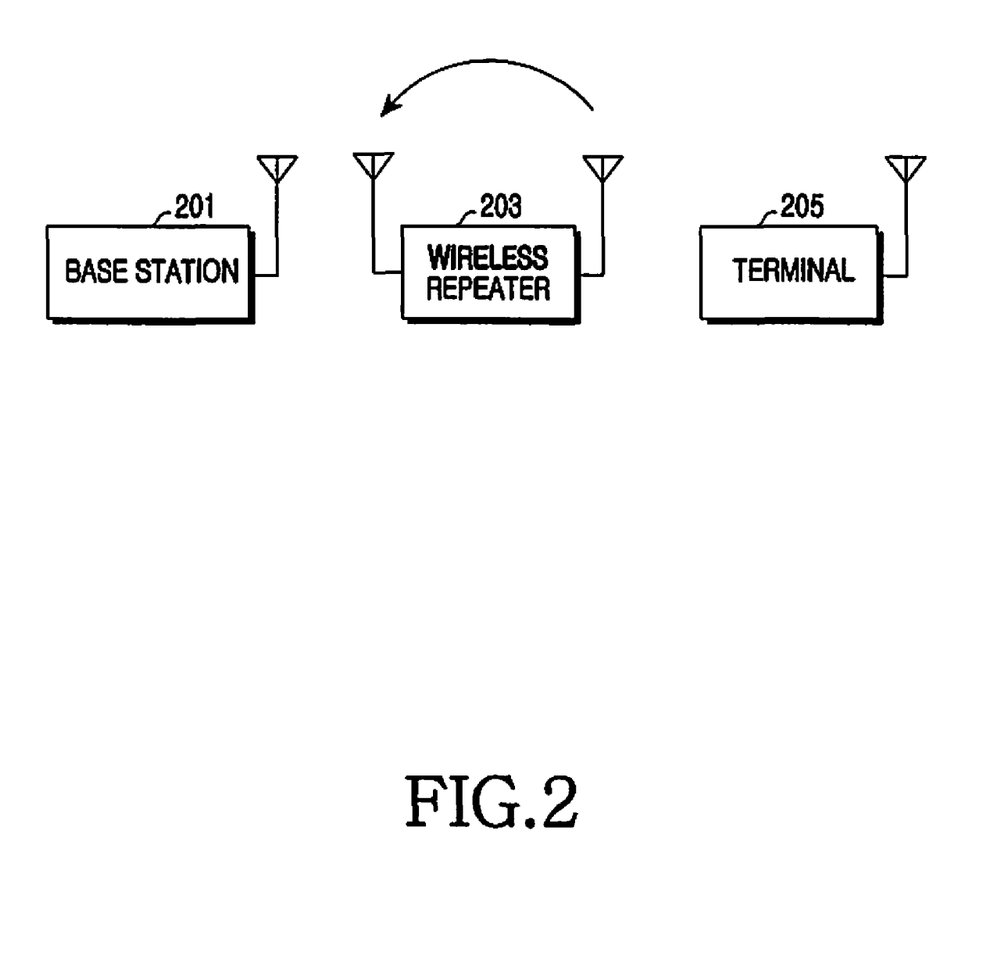
FIG. 2 is a diagram illustrating a signal flow of a wireless communication system to which a multi-carrier system according to an embodiment of the present invention is applied.

FIG. 2 is a diagram illustrating a signal flow of a wireless communication system to which a multi-carrier system according to an embodiment of the present invention is applied. In the following description, the multi-carrier system includes data transmission schemes dividing data into a plurality of components, and conveying the components onto respective carrier signals and transmitting the same, such as Digital Audio Broadcasting (DAB), Digital Video Broadcasting (DVB), an Asymmetric Digital Subscriber Line (ADSL), and a Local Area Network (LAN). The following description will be made using a general construction of these data transmission schemes.

Referring to FIG. 2, a signal of a base station 201 is transmitted to a wireless repeater 203. The wireless repeater 203 that has received the signal of the base station 201 amplifies the received signal. After that, the wireless repeater 203 transmits the amplified signal to a terminal 205 via a transmission end.

The wireless repeater 203 estimates an echo channel coefficient of a next train signal section using an echo channel coefficient of a train signal section such as a preamble, including a train signal. The wireless repeater 203 removes an echo channel outside the train signal section, specifically, in a section between a specific preamble and the next preamble of the specific preamble, using the estimated coefficient. The wireless repeater can prevent reception of an echo signal, which is a portion of signals transmitted to the terminal 205, using the above-described method.

Figure 3:
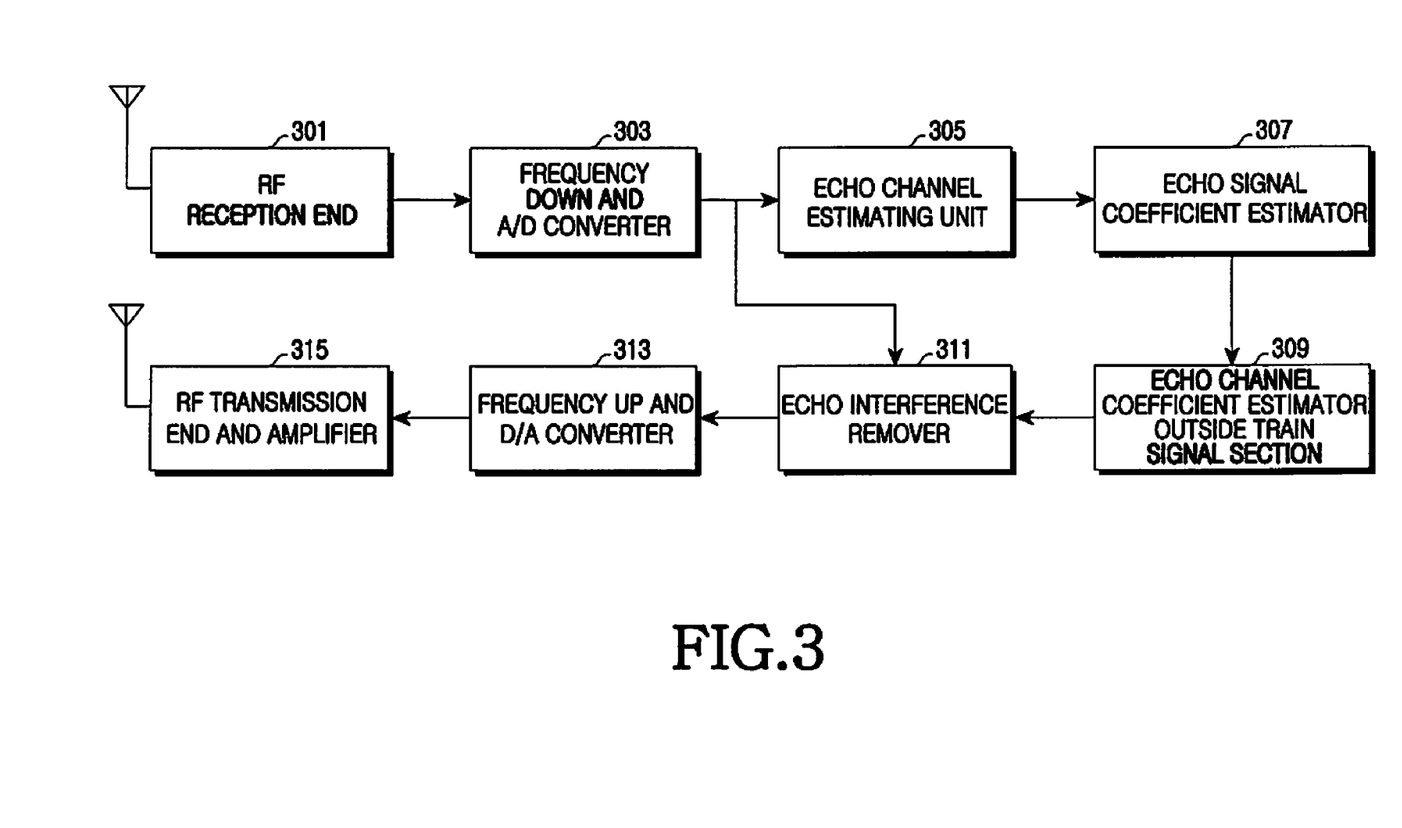
FIG. 3 is a block diagram illustrating a wireless repeater operating in a multi-carrier system, according to an embodiment of the present invention.

FIG. 3 is a block diagram illustrating a wireless repeater operating in a multi-carrier system, according to an embodiment of the present invention.

Referring to FIG. 3, the wireless repeater includes a Radio Frequency (RF) reception end 301, a frequency down and Analog/Digital (A/D) converter 303, an echo channel estimating unit 305, an echo signal coefficient estimator 307, an echo channel coefficient estimator 309 outside a train signal section, an echo interference remover 311, a frequency up and D/A converter 313, and an RF transmission end and amplifier 315.

First, the RF reception end 301 of the wireless repeater receives an RF signal transmitted from a base station via an antenna, and transfers the received RF signal to the frequency down and A/D converter 303. The frequency down and A/D converter 303 converts the radio signal provided from the RF reception end 301 to a digital signal having a low frequency.

The echo channel estimating unit 305 estimates a current echo channel coefficient of a train signal section using a digital signal converted by the frequency down and A/D converter 303. The echo channel coefficient estimator 307 estimates an echo channel linear prediction coefficient considering a time-variant characteristic using the estimated current echo channel coefficient and a previous echo channel coefficient estimated in advance by the echo channel coefficient estimator 307. The echo channel linear prediction coefficient is a coefficient for estimating a next train signal section, specifically, a coefficient representing a section between a current train signal section and the next train signal section.

The echo channel coefficient estimator 309 outside the train signal section estimates an echo channel coefficient outside a train signal section using the echo channel linear prediction coefficient estimated by the echo signal coefficient estimator 307. The echo channel outside the train signal section is an echo channel generated between a specific preamble and the next preamble of the specific preamble, specifically, an echo channel generated in a section outside the train signal section. The echo channel coefficient estimator 309 outside the train signal section can estimate an echo channel coefficient outside the train signal section using an echo channel coefficient of the train signal section estimated by the echo channel estimating unit 305 and an echo channel coefficient of the next train signal section estimated by the echo signal coefficient estimator 307.

The echo interference remover 311 removes interference of an echo channel outside a train signal section estimated by the echo channel coefficient estimator 309 outside the train signal section. The frequency up and A/D converter 313 up-converts the echo signal-removed signal and converts the signal to an analog signal.

The RF transmission end and amplifier 315 transmits the converted analog signal to the terminal 205.

Figure 4:
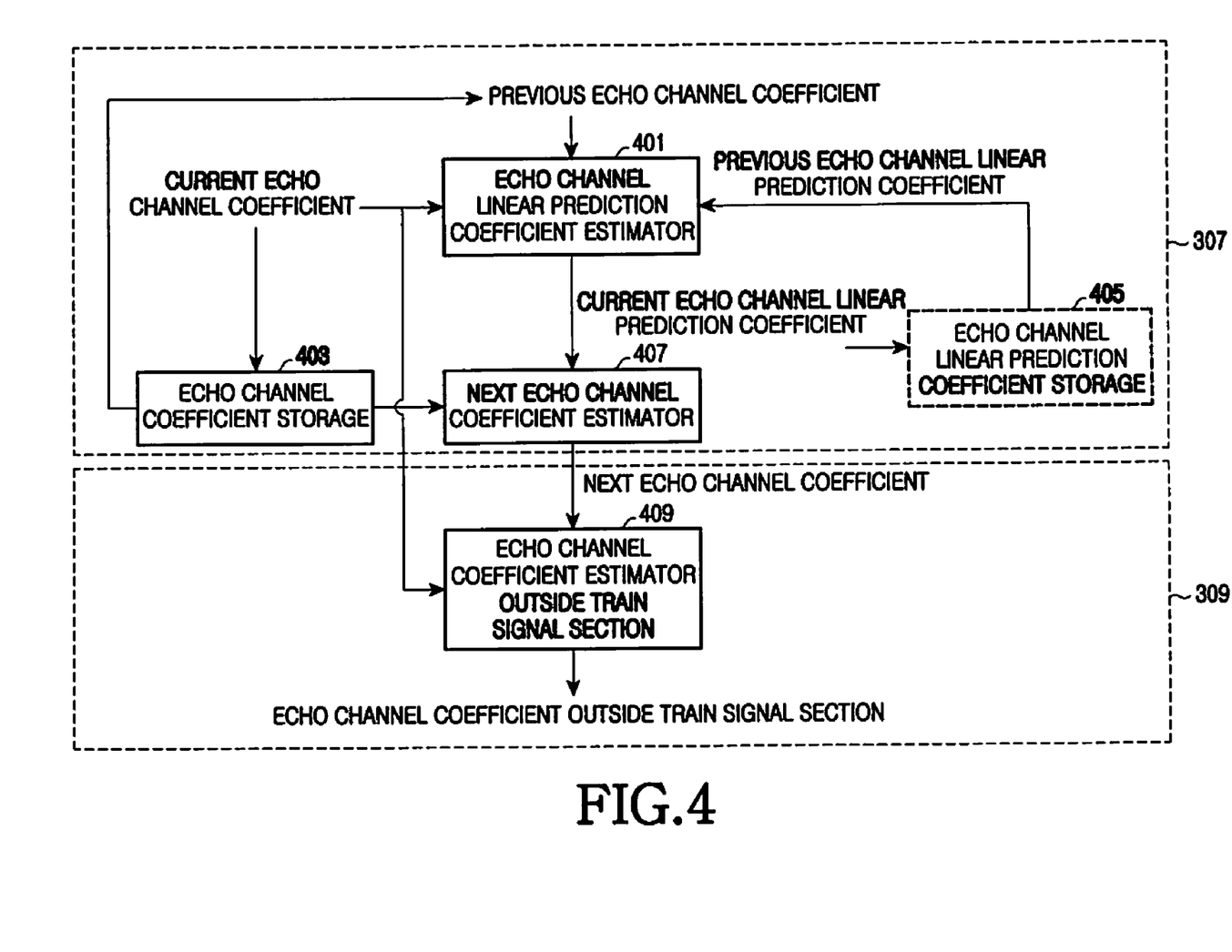
FIG. 4 is a block diagram illustrating an apparatus for estimating an echo channel at a wireless repeater, according to an embodiment of the present invention.

FIG. 4 is a block diagram illustrating an apparatus for estimating an echo channel at a wireless repeater, according to an embodiment of the present invention. The apparatus for estimating an echo channel includes the echo signal coefficient estimator 307 and the echo channel coefficient estimator 309 outside the train signal section, as described in FIG. 3. The echo signal coefficient estimator 307 includes an echo channel linear prediction coefficient estimator 401, an echo channel coefficient storage 403, an echo channel linear prediction coefficient storage 405, and a next echo channel coefficient estimator 407. It is assumed that the apparatus for estimating the echo channel stores echo channel coefficients measured in advance, and estimates a current echo channel linear prediction coefficient between a previous train signal section and a current train signal section using echo channel coefficients of the train signal section, a linear prediction coefficient of a previous train signal section predicted in advance, and an echo channel coefficient of a current train signal section, which is an echo channel coefficient of the train signal section.

Referring to FIG. 4, the echo channel linear prediction coefficient estimator 401 estimates a current echo channel linear prediction coefficient between a previous train signal section and a current train signal section using a current echo channel coefficient of a train signal section estimated by the echo channel estimating unit 305 described in FIG. 3, a previous echo channel linear prediction coefficient generated by the echo signal coefficient estimator 307. Specifically, the echo channel linear prediction coefficient estimator uses a linear prediction coefficient of a previous train signal section predicted in advance, and an echo channel coefficient of a current train signal section, which is an echo channel coefficient of a train signal section. The linear prediction coefficient represents a time-variant characteristic of an echo channel and is set considering a time variant factor, such as a maximum allowance Doppler frequency of an echo channel. Also, the echo channel linear prediction coefficient estimator 401 can select the linear prediction coefficient using MMSE estimation, or it can estimate the linear prediction coefficient by applying an algorithm of Normalized Least Mean Squares (NLMS) and a Recursive Least Square (RLS) filter having far lower complexity.

The next echo channel coefficient estimator 407 estimates a next echo channel coefficient using the estimated current echo channel linear prediction coefficient and previous and current echo channel coefficients generated by the echo channel coefficient storage 403. When an echo channel coefficient estimated from M time-division train signal sections is used, the wireless repeater can estimate the next echo channel coefficient by multiplying M echo channel impulse responses by appropriate weights, respectively, and calculating total sum using Equation (1) below.

$$\tilde{f}_{n+1}[m] = \sum_{l=0}^{M-1} w_l \cdot \hat{f}_{n-l}[m] \tag{1}$$

where m is a sample index of a train signal section, generally a last sample index is selected as m, $\tilde{f}_{n+1}[m]$ and $\hat{f}_{n-l}[m]$ are an echo channel impulse response estimated in an (n−1)th time-division section, and an echo channel impulse response predicted in the next train signal section, respectively, and $w_l$ is a weight coefficient. The weight coefficient is an echo channel linear prediction coefficient.

An echo channel coefficient estimator 409 outside a train signal section predicts an echo channel coefficient outside a train signal section using the predicted next echo channel coefficient and current echo channel coefficients.

The previous echo channel coefficient is stored in the echo channel coefficient storage 403 and replaced by the current echo channel coefficient at a change point of a preamble. The previous echo channel linear prediction coefficient is stored in the echo channel linear prediction coefficient storage 405, and replaced by a current echo channel linear prediction coefficient at a change point of a preamble.

Figure 5:
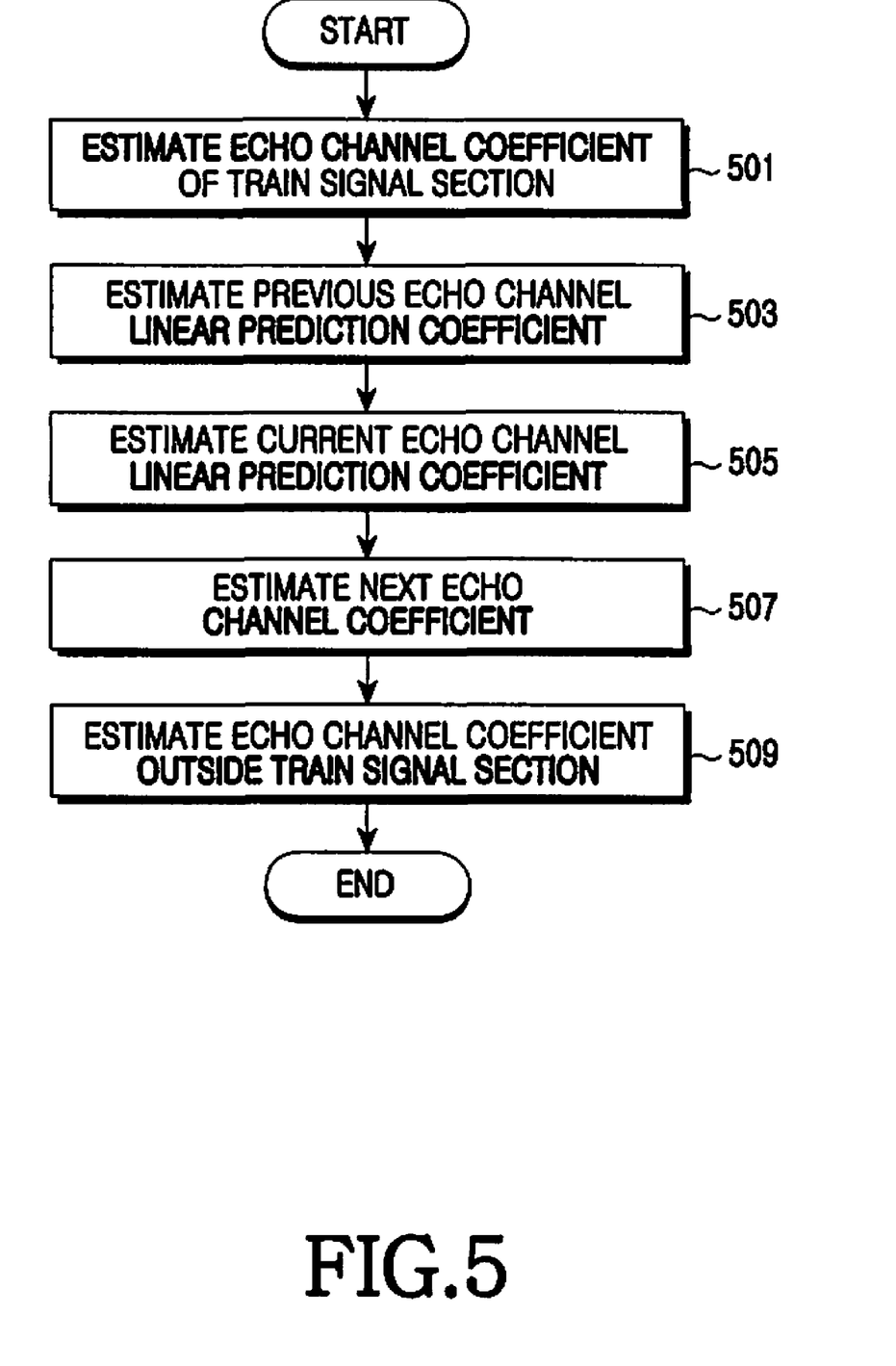
FIG. 5 is a flowchart illustrating a process of estimating an echo channel outside a train signal section at a wireless repeater, according to an embodiment of the present invention.

FIG. 5 is a flowchart illustrating a process of estimating an echo channel outside a train signal section at a wireless repeater, according to an embodiment of the present invention.

Referring to FIG. 5, the wireless repeater estimates current echo channel coefficients of a train signal section and reads a previous echo channel coefficient stored in an echo channel coefficient storage in step 501, and estimates a previous echo channel linear prediction coefficient in step 503. The wireless repeater allows the echo signal coefficient estimator 307 to check a previous echo channel coefficient of a train signal section stored in the echo channel coefficient storage 403. Also, the wireless repeater allows the echo signal coefficient estimator 307 to estimate a previous echo channel linear prediction coefficient stored in the echo channel linear prediction coefficient storage 405.

In step 505, the wireless repeater allows the echo signal coefficient estimator 307 to estimate a current echo channel linear prediction coefficient using current echo channel coefficients of a current train signal section and the previous echo channel coefficient estimated in the above steps.

In step 507, the wireless repeater allows the next echo channel coefficient estimator 407 to estimate a next echo channel coefficient using a current echo channel linear prediction coefficient estimated by the echo signal coefficient estimator 307, a previous echo channel coefficient updated by the echo channel coefficient storage 403, and the estimated current echo channel coefficients. The wireless repeater transfers the estimated coefficients to the echo channel coefficient estimator 409 outside the train signal section.

In step 509, the wireless repeater allows the echo channel coefficient estimator 409 outside the train signal section to estimate an echo channel coefficient outside the train signal section, specifically, an echo channel coefficient between a current train signal section and the next train signal section using a current echo channel coefficient and an estimated next echo channel coefficient.

The wireless repeater removes an echo signal interference using the estimated coefficient, and then ends the present process.

Figure 6:
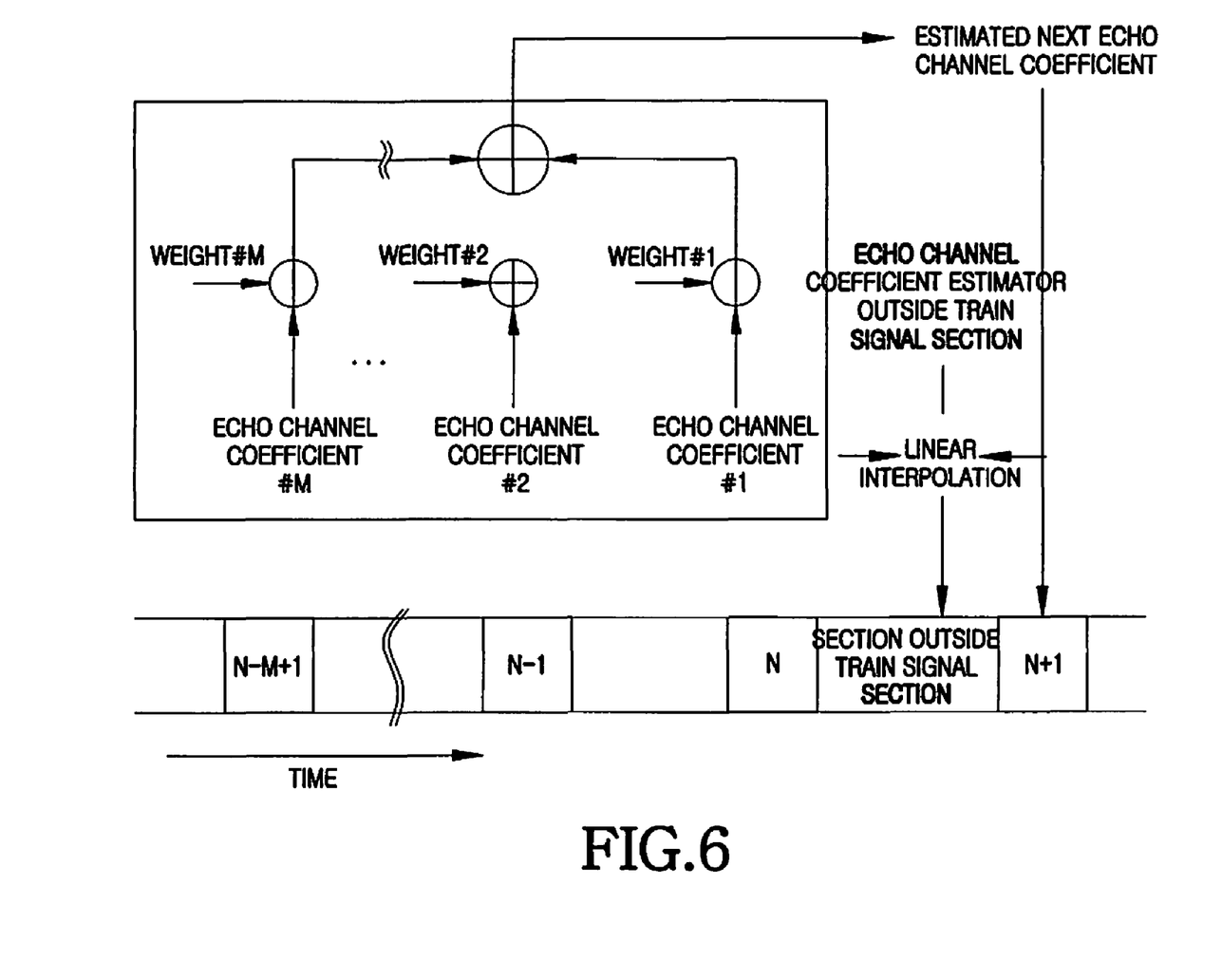
FIG. 6 is a diagram illustrating a process of estimating an echo channel outside a train signal section, according to an embodiment of the present invention.

FIG. 6 is a diagram illustrating a process of estimating an echo channel outside a train signal section, according to an embodiment of the present invention. Referring to FIG. 6, the echo channel coefficient estimator 409 outside the train signal section can estimate an echo channel coefficient outside a train signal section by applying linear interpolation to the current echo channel coefficient and the next echo channel coefficient.

As described above, the present invention can maintain an accuracy of an echo channel estimated from a periodic time division train signal section even in a section outside the train signal section by predicting an echo signal outside the train signal section and removing the predicted echo signal in a wireless repeater of a multi-carrier system, which includes a transmission section of a train signal such as a preamble and a mid-amble. Therefore, the present invention can suppress oscillation by an echo interference and obtain stable operation of a wireless repeater. Also, since the wireless repeater does not generate/transmit a separate signal, an additional bandwidth loss or signal limitation is not generated in comparison with an existing multi-carrier signal.

While the invention has been shown and described with reference to certain preferred embodiments thereof, it will be understood by those skilled in the art that various changes in form and details may be made therein without departing from the spirit and scope of the invention as defined by the appended claims. Therefore, the scope of the present invention should not be limited to the above-described embodiments but should be determined by not only the appended claims but also the equivalents thereof.

What is claimed is:

1. A wireless repeater for removing an echo signal in a multi-carrier system, the wireless repeater comprising:
    an echo channel estimating unit for estimating a current echo channel coefficient of a current train signal section comprising a preamble;
    an echo channel linear prediction coefficient estimator for estimating a current echo channel linear prediction coefficient, which represents a coefficient between the current train signal section and a previous train signal section, using the current echo channel coefficient and a previous echo channel coefficient, which is an echo channel coefficient of the previous train signal section;
    a next echo channel coefficient estimator for estimating a next echo channel coefficient using the current echo channel coefficient, the previous echo channel coefficient, and the current echo channel linear prediction coefficient; and
    an echo channel coefficient estimator outside the train signal section, for estimating an echo channel coefficient outside the train signal section using the current echo channel coefficient and the next echo channel coefficient.

2. The wireless repeater for removing the echo signal in the multi-carrier system of claim 1, further comprising an echo channel coefficient storage for replacing the previous echo channel coefficient by the current echo channel coefficient when the current train signal section changes into a next train signal section.

3. The wireless repeater for removing the echo signal in the multi-carrier system of claim 1, further comprising an echo channel linear prediction coefficient storage for replacing a previous echo channel linear prediction coefficient by the current echo channel linear prediction coefficient when the current train signal section changes into a next train signal section.

4. The wireless repeater for removing the echo signal in the multi-carrier system of claim 3, wherein the echo channel linear prediction coefficient estimator performs estimation by applying an algorithm of Minimum Mean Square Error (MMSE) estimation, Normalized Least Mean Squares (NLMS), and a Recursive Least Squares (RLS) filter to the previous echo channel coefficient and the current echo channel coefficient estimated in the current train signal section, and the previous echo channel linear prediction coefficient.

5. The wireless repeater for removing the echo signal in the multi-carrier system of claim 1, wherein the next echo channel coefficient estimator performs estimation by applying the following equation to the current echo channel linear prediction coefficient and echo channel coefficients stored in advance:

$$\tilde{f}_{n+1}[m] = \sum_{l=0}^{M-1} w_l \cdot \hat{f}_{n-l}[m]$$

where m is a sample index of a train signal section, $\tilde{f}_{n+1}[m]$ and $\hat{f}_{n-l}[m]$ are an echo channel impulse response estimated in an (n−1)th time-division section, and an echo channel impulse response predicted in the next train signal section, respectively, $w_l$ is a weight coefficient, wherein the weight coefficient is an echo channel linear prediction coefficient.

6. The wireless repeater for removing the echo signal in the multi-carrier system of claim 1, wherein the echo channel coefficient estimator outside the train signal section performs estimation by applying linear interpolation to an echo channel coefficient of a next train signal section and the current echo channel coefficient.

7. A method for removing an echo signal in a multi-carrier wireless repeater system, the method comprising the steps of:
    estimating a current echo channel linear prediction coefficient, which represents a coefficient between a current train signal section and a previous train signal section, using a current echo channel coefficient estimated in the current train signal section comprising a preamble and a previous echo channel coefficient generated in the previous train signal section;
    estimating a next echo channel coefficient using the current echo channel coefficient, the previous echo channel coefficient, and the current echo channel linear prediction coefficient; and estimating an echo channel coefficient outside a train signal section using the current echo channel coefficient and the next echo channel coefficient.

8. The method for removing the echo signal in the multi-carrier wireless repeater system of claim 7, wherein the previous echo channel coefficient is formed by replacing the previous echo channel coefficient by the current echo channel coefficient when the current train signal section changes into a next train signal section.

9. The method for removing the echo signal in the multi-carrier wireless repeater system of claim 1, wherein the previous echo channel linear prediction coefficient is replaced by a current echo channel linear prediction coefficient when the current train signal section changes into a next train signal section, and wherein the current echo channel linear prediction coefficient is estimated using the current echo channel coefficient, the previous echo channel coefficient, and the previous echo channel linear prediction coefficient.

10. The method for removing the echo signal in the multi-carrier wireless repeater system of claim 9, wherein estimating the current echo channel linear prediction coefficient comprises applying an algorithm of Minimum Mean Square Error (MMSE) estimation, Normalized Least Mean Squares (NLMS), and a Recursive Least Squares (RLS) filter to the previous echo channel coefficient and the current echo channel coefficient estimated in the current train signal section, and the previous echo channel linear prediction coefficient.

11. The method for removing the echo signal in the multi-carrier wireless repeater system of claim 7, wherein estimating the next echo channel coefficient comprises applying the follow equation to the current echo channel linear prediction coefficient and echo channel coefficients stored in advance:

$$\tilde{f}_{n+1}[m] = \sum_{l=0}^{M-1} w_l \cdot \hat{f}_{n-l}[m]$$

where m is a sample index of a train signal section, $\tilde{f}_{n+1}[m]$ and $\hat{f}_{n-1}[m]$ are an echo channel impulse response estimated in an (n−1)th time-division section and an echo channel impulse response predicted in a next train signal section, respectively, $w_1$ is a weight coefficient, wherein the weight coefficient is an echo channel linear prediction coefficient.

12. The method for removing the echo signal in the multi-carrier wireless repeater system of claim 7, wherein estimating the echo channel coefficient outside the train signal section comprises applying linear interpolation to an echo channel coefficient of a next train signal section and the current echo channel coefficient.

* * * * *